(12) United States Patent
Zinbo

(10) Patent No.: US 6,312,796 B1
(45) Date of Patent: *Nov. 6, 2001

(54) MAGNETIC RECORDING MEDIUM

(75) Inventor: Noboru Zinbo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/436,002

(22) Filed: Nov. 8, 1999

(30) Foreign Application Priority Data

Nov. 11, 1998 (JP) .................................................. 10-320644

(51) Int. Cl.⁷ ...................................................... B32B 5/16
(52) U.S. Cl. .......................... 428/323; 428/328; 428/329; 428/336; 428/694 BA; 428/694 BN; 428/694 BS; 428/900
(58) Field of Search ...................................... 428/323, 328, 428/329, 336, 694 BA, 694 BN, 694 BS, 900

(56) References Cited

U.S. PATENT DOCUMENTS

| 5,087,434 | * | 2/1992 | Frenklach et al. | 423/446 |
| 5,326,618 | * | 7/1994 | Ryoke et al. | 428/141 |
| 5,512,350 | | 4/1996 | Ryoke et al. | 428/141 |
| 6,096,406 | * | 8/2000 | Yamazaki et al. | 428/141 |

FOREIGN PATENT DOCUMENTS

| A-6-267059 | 9/1994 | (JP) . |
| A-8-255334 | 10/1996 | (JP) . |
| A-11-86273 | 3/1999 | (JP) . |
| A-11-250448 | 9/1999 | (JP) . |

\* cited by examiner

*Primary Examiner*—Stevan A. Resan
(74) *Attorney, Agent, or Firm*—Sughrue, Mion, Zinn, Macpeak & Seas, PLLC

(57) ABSTRACT

Disclosed is a magnetic recording medium which comprises a support having provided thereon a magnetic layer containing at least a ferromagnetic powder and a diamond particle, wherein the diamond particle has an average particle diameter of from 3 to 200 nm and a variation coefficient of the particle diameter of from 3 to 60%.

5 Claims, No Drawings

MAGNETIC RECORDING MEDIUM

FIELD OF THE INVENTION

The present invention relates to a magnetic recording medium such as a magnetic tape, particularly to a coating type magnetic recording medium (i.e., a magnetic recording particulate medium) comprising a support having coated thereon a magnetic coating solution mainly comprising a ferromagnetic metal powder and a binder to form a magnetic layer, which is excellent in noise, output and C/N in a short wavelength region, excellent in overwriting characteristics, still and durability, and is suitable for a magneto resistance type (MR) head.

BACKGROUND OF THE INVENTION

Magnetic recording techniques have been widely utilized in various fields including video, audio and computer, because magnetic recording techniques have excellent characteristics that recording media can be used repeatedly, signals can be easily electronized, a system can be constructed in combination with peripheral equipments, and signals can be modified easily which other recording systems do not have.

Therefore, with respect to recording media, it has always been required to further improve recording density, reliability and durability to correspond to the requirements such as the miniaturization of equipments, the improvement Blithe quality of recording/reproduction signals, long term recording, and the increase of recording capacity.

For instance, in audio and video uses, it has been required to realize a digital recording system which can realize the improvement of sound and image qualities, and a magnetic recording medium which can record and reproduce further shorter wavelength signals than in conventional systems and is excellent in reliability and durability even if the relative speed of a head and a medium becomes large for answering to the development of picture recording systems corresponding to high vision TV. Further, in computer use, the development of a high capacity digital recording medium has been desired for the storage of increasing amount of data.

For the realization of high density recording of a coating type magnetic recording medium, a variety of methods have been discussed and suggested from the viewpoints of, e.g., using a magnetic iron or alloy powder comprising iron as a main component in place of conventionally used magnetic iron oxide powders, the improvement of magnetic powders such as the atomization or magnetic powders to heighten the packing density and the orientation property to improve the magnetic characteristics of a magnetic layer, the improvement of the dispersibility of ferromagnetic powders, and the improvement of the surface property of a magnetic layer.

For example, for increasing magnetic characteristics, methods of using ferromagnetic metal powders and hexagonal ferrite powders as ferromagnetic powders are disclosed in JP-A-58-122623 (the term "JP-A" as used herein means an "unexamined published Japanese patent application"), JP-A-61-74137, JP-B-62-49656 (the term "JP-B" as used herein means an "examined Japanese patent publication"), JP-B-60-50323, U.S. Pat. Nos. 4,629,653, 4,666,770 and 4,543,198.

JP-A-1-18961 discloses a ferromagnetic powder having a specific surface area of from 30 to 55 m²/g, a coercive force of 1,300 Oe or more, and a saturation magnetization of 120 emu/g or more produced from a magnetic metal powder having a long axis length of from 0.05 to 0.2 μm and an axis ratio of from 4 to 8, thus suggests to provide fine metal powders having a small specific surface area. There are disclosed in JP-A-60-11300 and JP-A-60-21307 a method of producing a fine α-iron hydroxide acicular crystal suitable for a ferromagnetic powder, in particular, a ferromagnetic metal powder, and JP-A-60-21307 discloses the production of a ferromagnetic metal powder having a coercive force (Hc) of from 1,450 to 1,600 Oe, and a saturation magnetization ($\sigma_S$) of from 142 to 155 emu/g from goethite having a long axis length of from 0.12 to 0.5 μm and an axis ratio of from 6 to 8. JP-A-9-91684 proposes to use a ferromagnetic metal powder having an average long axis length of from 0.05 to 0.12 μm and an acicular ratio of 8 or more in a proportion of 5.0% or less of the entire ferromagnetic metal powder, or to use the foregoing ferromagnetic metal powder of crystallite constituting the ferromagnetic metal powder having an acicular ratio of 4 or more in a proportion of 17.0% or less of the entire ferromagnetic metal powder.

Japanese Patent Application No. 10-167224 suggests to use a ferromagnetic metal powder having an average long axis length of from 30 to 120 nm, an average acicular ratio of from 3.0 to 10.0, and the variation coefficient of an acicular ratio of from 5 to 30%. The atomization of magnetic powders, uniformization of particle sizes, shapes, acicular ratios have been advanced.

Further, a hematite nucleic crystal, iron hydroxide, a monodispersed spindle shape hematite particle wherein a specific ion is used, and an extremely fine ferromagnetic powder obtained by reducing the foregoing hematite particle are disclosed in JP-A-6-340426, JP-A-7-109122 and JP-A-9-227126.

For increasing the dispersibility of a ferromagnetic powder, it is proposed to use various kinds of surfactants (e.g., in JP-A-52-156606, JP-A-53-15803 and JP-A-53-116114), and a variety of reactive coupling agents (in JP-A-49-59608, JP-A-56-58135 and JP-B-62-28489).

JP-A-1-239819 proposes a magnetic powder obtained by coating in order a boron compound, an aluminum compound, or an aluminum compound and a silicon compound on the particle surfaces of a magnetic iron oxide to improve magnetic characteristics and dispersibility of the magnetic powder. Further, JP-A-7-22224 suggests a ferromagnetic metal powder containing 0.05% by weight or less of the elements belonging to Group Ia of the Periodic Table and, if necessary, from 0.1 to 30 atomic % of aluminum based on the total amount of the metal elements, and from 0 1 to 10 atomic % of rare earth elements based on the total amount of the metal elements, and 0.1% by weight or less of residues of the elements belonging to Group IIa of the Periodic Table, to obtain a high density magnetic recording medium excellent in storage stability and magnetic characteristics.

Moreover, for improving the surface property of a magnetic layer, a method of improving surface treating process of a magnetic layer after coating and drying is suggested (e.g., in JP-PA-60-44725).

For achieving high recording density of a magnetic recording medium, making shortwave of signals to be used has been aggressively advanced. When the length of the region to record signals becomes the size comparable with the size of the magnetic (powder) material used, clear magnetization transition state cannot be formed, as a result recording becomes substantially unfeasible. For that reason, it is necessary to develop a magnetic material having sufficiently minute particle size relative to the minimum wavelength used, therefore, the atomization of a magnetic (powder) material has been pointed out for a long time.

In a metal powder for magnetic recording, an aimed coercive force is obtained by making a particle shape acicular and providing shape anisotropy. It is well known in the art that for high density recording, the surface roughness of the medium obtained by atomizing a ferromagnetic metal powder must be made small. However, if a metal powder for magnetic recording is atomized, the acicular ratio thereof reduces and the aimed coercive force cannot be obtained. In recent years, a DVC system of recording video signals by digitization has been suggested and an ME tape of high performance and an MP tape of high performance are used.

For example, the present inventors have proposed a ferromagnetic metal powder suitable for a DVC system and a magnetic recording medium using the same (JP-A-7-326035). This invention is to provide a magnetic recording medium in which a magnetic layer is restrained to have a coercive force of from 2,000 to 3,000 Oe, a layer thickness of from 0.05 to 0.3 μm and surface roughness of from 1 to 3 nm, and specific reversal magnetization component rate is prescribed.

Alumina, titanium oxide and $Cr_2O_3$ are used as abrasives for the purpose of improving magnetic layer strength, hardness, durability, running property and head cleaning suitability, and inorganic powders such as carbon black are used for the purpose of improving electric conductivity, lubricating property and the friction coefficient of a magnetic layer.

For example, JP-A-8-255334 prescribes to include nonmagnetic powders having a Mohs' hardness of 6 or more in a magnetic layer in an amount of from 2 to 15 weight parts per 100 weight parts of the magnetic (powder) material, and discloses that the nonmagnetic powders having a Mohs' hardness of 6 or more are one or more powders selected from the group consisting of $\alpha$-$Al_2O_3$, $\gamma$-$Al_2O_3$, $\alpha$-$Fe_2O_3$, $\beta$-SiC, and diamond. However, the relationship between the nonmagnetic powders having a Mohs' hardness of 6 or more and the noise is not disclosed.

Since inorganic powders such as an abrasive cause noises and coarse protrusions on a magnetic layer, fine inorganic powders which are sufficient in a small amount and are excellent in particle size distribution have been demanded. For smoothing surface roughness of a magnetic layer and increasing density, it is desired for inorganic powders to have sufficient strength and abrasive property in a small amount, to improve magnetic layer strength, hardness, and to provide durability, running property and head cleaning suitability.

Further, the development of a system mounting a magneto resistive (MR) head more excellent in high density recording/reproduction characteristics has progressed and is now on the market. A magnetic recording medium suitable for an MR head which shows less turbulence of magnetization, low noise and a good S/N ratio has been desired.

SUMMARY OF THE INVENTION

The present invention has been done in consideration of the above-described problems of the conventional technique. The object of the present invention is to provide a magnetic recording medium applicable to a high density digital recording system which is low in noise, excellent in short wavelength region output, S/N ratio, still and durability, and a magnetic recording medium suitable for a magneto resistive (MR) head which shows less turbulence of magnetization and less noise, and is excellent in S/N ratio.

The above objects of the present invention have been attained by a magnetic recording medium comprising a support having provided thereon a magnetic layer containing at least a ferromagnetic powder and a diamond particle, wherein the diamond particle has an average particle diameter of from 3 to 200 nm, and the variation coefficient of a particle diameter of from 3 to 60%.

The preferred embodiments of the present invention are as follows.

(1) The magnetic recording medium as described above, wherein a nonmagnetic layer comprising a nonmagnetic powder and a binder resin as main components is provided between the support and the magnetic layer, and the magnetic layer has a dry thickness of from 0.01 to 0.5 μm (particularly preferably from 0.05 to 0.5 μm)

(2) The magnetic recording medium as described above, wherein the ferromagnetic powder is a ferromagnetic metal powder having an average long axis length of from 30 to 120 nm, an average acicular ratio of from 3.0 to 10.0, and a variation coefficient of an acicular ratio of from 5 to 30%.

(3) The magnetic recording medium as described above, wherein the ferromagnetic powder is a hexagonal ferrite powder having an average tabular diameter of 50 nm or less.

DETAILED DESCRIPTION OF THE INVENTION

A particle diameter of a diamond particle in the present invention is an equivalent-circle diameter obtained from a high resolution transmission type electron microphotograph. The equivalent-circle diameter is obtained by a circle projecting method. That is, the equivalent-circle diameter means a diameter of a circle having the same area as the projected area of a parthele. An average particle diameter is an arithmetic mean, and an average particle diameter and a standard deviation of a particle diameter are obtained by the measurement of about 500 diamond particles. The variation coefficient of a particle diameter is the value obtained by dividing the standard deviation of a particle diameter by an average particle diameter and multiplying 100 (%).

In the present invention, the average particle diameter of a diamond particle is from 3 to 200 nm, and the variation coefficient of a particle diameter is from 3 to 60%, as a result, the present invention can provide a magnetic recording medium applicable to a high density digital recording system which is low in noise, excellent in short wavelength region output, S/N ratio, still and durability, and a magnetic recording medium suitable for a magneto resistive (MR) head which shows less turbulence of magnetization and less noise, is excellent in S/N ratio, still and durability.

In the present invention, the average particle diameter of a diamond particle is from 3 to 200 nm, preferably from 30 to 150 nm, and still more preferably from 30 to 120 nm, and the variation coefficient of a particle diameter is from 3 to 60%, preferably from 3 to 55%, and still more preferably from 3 to 50%.

If the average particle diameter is larger than 200 nm, coarse protrusions are generated, turbulence of magnetization becomes conspicuous, noise increases, and an excellent S/N ratio cannot be obtained.

If the variation coefficient of a particle diameter of a diamond particle is larger than 60%, noise increases and an excellent S/N ratio cannot be obtained. Further, there are some cases where the addition amount of a diamond particle must be increased for giving to a magnetic recording medium a desired abrasive property, but if the addition amount of a diamond particle is increased over the necessary amount, turbulence of magnetization becomes more conspicuous, surface roughness becomes large, noise increases, and an excellent S/N ratio is obtained with difficulty.

The addition amount of a diamond particle is from 0.001 to 5 weight parts and more preferably from 0.001 to 3 weight parts, per 100 weight parts of the ferromagnetic powder. If the amount of a diamond particle is less than this range, a sufficiently high abrasive property necessary for a magnetic recording medium cannot be obtained, and desired head cleaning suitability, still and durability cannot be obtained. While when the amount is more than this range, saturation magnetic flu<density of a magnetic recording medium lowers, noise increases, output decreases, therefore, an excellent S/N ratio cannot be obtained. in addition, the abrasion loss of a head becomes large.

In the present invention, the above-described methods of controlling the particle diameter and the particle size distribution are not particularly limited and any arbitrary means can be used. Preferred methods include the following: that is, in producing process of fractionation of particle sizes of diamond particles comprising pulverization of a starting material diamond of uniform particle sizes of a monocrystal or polycrystal diamond, such as a natural diamond, an artificial diamond produced by a high temperature high pressure method, and an artificial diamond produced by an explosion method by means of a ball mill, etc., gravity separation, screening, elulriating classification and/or centrifugation, methods (1) of using a starting material diamond of more uniform particle sizes, (2) performing gravity separation, screening, elutriating classification and/ or centrifugation more precisely and in multistage processing, and (3) the diamond after the pulverization, or the diamond having been subjected to gravity separation, screening, elutriating classification and/or centrifugation more precisely and in multistage processing, i.s further subjected to heat treatment at 350 to 3,000° C. in an inactive gas atmosphere, or plasma treatment, can be exemplified.

In a conventional magnetic recording medium, the amount of abrasives to be added to a magnetic layer is difficult to be reduced because abrasives used are low in abrasive property, grinding property and hardness, hence the reduction of noise and the improvement of an S/N ratio are difficult. However, the present inventors presume that the noise of a magnetic recording medium can be reduced, an S/N ratio, still and durability can be improved in the present invention by controlling the particle diameter and the particle size distribution due to the addition of a diamond fine particle as an abrasive. The present inventors consider that conventionally used abrasives are low in abrasive property, grinding property and hardness, diamond particles have large particle diameters, and the controlling of the particle diameter is insufficient, therefore, the reduction of noise and the improvement of an S/N ratio, still and durability of a magnetic recording medium are insufficient.

Since a magnetic recording medium according to the present invention can reduce the noise originating in a medium, a high capacity magnetic recording medium can be constructed. Therefore, when a magnetic recording medium according to the present invention is used, in particular, in a system in which an MR element and a huge magneto resistance element are used as a reproduction head, the effect of the present invention can be exhibited effectively.

As a ferromagnetic powder, a ferromagnetic metal powder and a hexagonal ferrite powder are preferably used in the present invention. A ferromagnetic metal powder has saturation magnetization of generally from 100 to 170 emu/g, preferably from 105 to 160 emu/g. Saturation magnetization of a ferromagnetic metal powder can be effectively increased by the treatment using the compounds and the coupling agents having various substituents as disclosed in JP-A-61-52327 and JP-A-7-94310 just after reduction and followed by gradual oxidization treatment.

A ferromagnetic powder generally has a coercive force of from 1,700 to 3,000 Oe, preferably from 1,800 to 2,800 Oe.

Ferromagnetic metal powders which can be used in the magnetic layer of the present invention are preferably ferromagnetic alloy powders containing α-Fe as main component. These ferromagnetic metal powders which can be preferably used in the magnetic layer of the present invention may contain, in addition to the prescribed atoms, the following atoms, e.g., Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. In particular, it is preferred to contain at least one of Al, Si, Ca, Y, Ba, La, Nd, Co, Ni and B, in addition to α-Fe, and more preferably at least one of Co, Y and Al in addition to α-Fe. The content of Co is preferably from 0 to 40 atomic %, more preferably from 15 to 35 atomic %, and most preferably from 20 to 35 atomic %, the content of Y is preferably from 1.5 to 12 atomic %, more preferably from 3 to 10 atomic %, and most preferably from 4 to 9 atomic %, the content of Al is preferably from 1.5 to 20 atomic %, more preferably from to 20 atomic %, and most preferably from 4 to 16 atomic %, each based on Fe. These ferromagnetic metal powders may be previously treated with the later described dispersant, lubricant, surfactant, and antistatic agent before dispersion. Specific examples thereof are disclosed in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, U.S. Pat. Nos. 3,026,215, 3,031,341, 3,100,194, 3,242,005, and 3,389,014.

Ferromagnetic metal powders may contain a small amount of a hydroxide or an oxide. Ferromagnetic metal powders can be prepared by well-known processes, such as a method comprising reducing a composite organic acid salt (mainly an oxalate) with a reducing gas, e.g., hydrogen; a method comprising reducing iron oxide with a reducing gas, e.g., hydrogen, to obtain Fe or Fe—Co particles; a method comprising pyrolysis of a metal carbonyl compound; a method comprising adding to an aqueous solution of a ferromagnetic metal a reducing agent, e.g., sodiumborohydride, hypophosphite, or hydrazine, to perform reduction; and a method comprising evaporating a metal in a low pressure inert gas to obtain a powder. The thus-obtained ferromagnetic metal powders which are subjected to well-known gradual oxidization treatment can be used in the present invention, e.g., a method comprising immersing powders in an organic solvent, then drying; a method comprising immersing powders in an organic solvent, then charging an oxygen-containing gas to form oxide films on the surfaces thereof and drying; and a method comprising forming oxide films on the surfaces of the powders by regulating partial pressure of an oxygen gas and an inert gas without using an organic solvent.

Ferromagnetic metal powders which can be preferably used in the magnetic layer according to the present invention have a specific surface area ($S_{BET}$) as measured by the BET method of from 40 to 80 m²/g, preferably from 45 to 70 m²/g. When $S_{BET}$ less than 40 m²/g noise increases and when it is more than 80 m²/g, good surface property is obtained with difficulty, which is not preferred.

Ferromagnetic metal powders which can be preferably used in the magnetic layer according to the present invention have a crystallite size of preferably from 80 to 180 Å, more preferably from 100 to 180 Å, and particularly preferably from 110 to 175 Å. The average long axis length of ferromagnetic metal powders is proferably from 30 to 120 nm, and more preferably from 30 to 100 nm. Ferromagnetic metal powders preferably have an average acicular ratio of from 3.0 to 10.0, more preferably from 3.0 to 9.0. Ferromagnetic metal powders have the variation coefficient of an acicular ratio of preferably from 5 to 30%, more preferably from 5 to 28%. The average acicular ratio means an arithmetic mean of ar acicular ratio (long axis length/short axis length) of each particle. The variation coefficient of an acicular ratio is the value obtained by dividing the standard deviation of an acicular ratio by an average acicuilar ratio and multiplying 100 (%). The measured values are obtained by measuring about 500 diamond particles with a high resolution transmission type electron microscope.

Ferromagnetic metal powders preferably have a water content of from 0.01 to 2% by weight. The water content of ferromagnetic metal powders is preferably optimized by selecting the kinds of binders described later.

Ferromagnetic metal powders preferably have a tap density of from 0.2 to 0.8 g/ml. If a tap density is larger than 0.8 g/ml, uniform gradual oxidization of the ferromagnetic metal powder is difficult, thus the powder cannot be handled safely, or the magnetization of the produced tape reduces with the lapse of time. On the other hand, if it is less than 0.2 g/ml, dispersion is liable to be insufficient.

The pH of ferromagnetic metal powders is preferably optimized by the combination with the binder to be used. The pH range is from 4 to 12, preferably from 6 to 10. Ferromagnetic( metal powders may be surface-treated with Al, Si, P or oxides thereof, if necessary. The amount thereof is from 0.1 to 10% by weight based on the ferromagnetic metal powders. Adsorption of a lubricant, e.g., fatty acid, becomes 100 mg/m$^2$ or less by conducting a surface treatment, which is, therefore, preferred. Soluble inorganic ions (e.g., Na, Ca, Fe, Ni, Sr, etc.) are sometimes contained in ferromagnetic metal powders. It is preferred substantially not to contain such soluble inorganic ions but the properties of ferromagnetic metal powders are not particularly affected if the content is 200 ppm or less. Ferromagnetic metal powders for use in the present invention preferably have less voids and the value thereof is 20% by volume or less, more preferably 5% by volume or less. The shape of ferromagnetic metal powders is not particularly limited, and any shape such as an acicular shape, an ellipsoidal shape or a spindle shape may be used. Switching Field Distribution (SFD) of the ferromagnetic metal powder itself is preferably small, more preferably 0.8 or less. It is necessary to make Hc distribution of ferromagnetic metal powders narrow. When the SFD is 0.8 or less, electromagnetic characteristics are excellent, high output can be obtained, reversal of magnetization becomes sharp and peak shift is less, therefore, suitable for high density digital magnetic recording. For achieving small Hc distribution, making particle size distribution of goethite in ferromagnetic metal powders good and preventing sintering are effective methods for ferromagnetic metal powders.

Hexagonal Ferrite Powder

Examples of hexagonal ferrite which can be preferably used in the magnetic layer in the present invention include substitution products of barium ferrite, strontium ferrite, lead ferrite and calcium ferrite and Co substitution products, and barium ferrite is particularly preferred among these. Specifically, magnetoplumbite to type barium ferrite and strontium ferrite, magnetoplumbite type ferrite having covered the particle surfaces with spinel, magnetoplumbite type barium ferrite and strontium ferrite partially containing spinel phase, etc. Hexagonal ferrite powders may contain, in addition to the prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, those containing the following elements can be used, e.g., Co—Zn, Co—Ti, Co—Ti—Zr, Co—Ti—Zn, Ni—Ti—Zn, Nb—Zn—Co, Sb—Zn—Co, Nb—Zn, etc. According to starting materials and producing processes, specific impurities may be contained.

The particle size of ferromagnetic hexagonal ferrite powders is the average of the longest diameter of hexagonal tabular (hereinafter referred to as "average tabular diameter") and is generally from 10 to 50 nm, preferably from 10 to 40 nm, and particularly preferably from 10 to 35 nm.

When reproduction is conducted using a magneto resistance head for increasing track density, it is necessary to reduce noise, accordingly the tabular diameter is preferably 40 nm or less, but if it is smaller than 10 nm, stable magnetization cannot be obtained due to thermal fluctuation. While when it is more than 50 nm, noise increases, therefore, both of such particle diameters are not suitable for high density magnetic recording. An average tabular ratio which is an arithmetic mean of a tabular ratio (tabular diameter/tabular thickness) is preferably from 1 to 15, more preferably from 1 to 8.

If a tabular ratio is small, the packing density in a magnetic layer becomes high, which is preferred but satisfactory orientation cannot be obtained. If a tabular ratio is more than 15, noise increases due to stacking among particles. The specific surface area ($S_{BET}$) measured by the BET method of the particles having diameters within this range is from 10 to 200 m$^2$/g. Specific surface areas nearly coincide with the values obtained by arithmetic operations from tabular diameters and tabular thickness. Distribution of tabular diameter/tabular thickness is generally preferably as narrow as possible. It is difficult to show specific surface area distributions in numerical values but distributions can be compared by measuring TEM photographs of 500 particles selected randomly. Distributions are in many cases not regular distribution, but when expressed by the standard deviation a of the tabular diameter or the tabular thickness to the average size (average tabular diameter and average tabular thickness) from calculation, σ/average size is from 0.1 to 2.0. For obtaining narrow particle size distribution, it is efficient to make a particle forming reaction system homogeneous as far as possible, and particles formed are subjected to distribution-improving treatments as well. For example, a method of selectively dissolving ultrafine(e particles in an acid solution is also known. Coercive force (Hc) of generally from about 500 to about 5,000 Oe measured in magnetic powders can be produced. Higher Hc is advantageous for high density recording but it is restricted by capacities of recording heads. Hc can be controlled by particle diameters (tabular diameter/tabular thickness), kinds and amounts of elements contained, substitution sites of elements, and reaction conditions of particle formation. Saturation magnetization ($\sigma_S$) is from 40 to 80 emu/g. $\sigma_S$ is preferably higher but it has inclination of becoming smaller as particles become finer. For the improvement of $\sigma_S$, it is well known to make composite of magnetoplumbite ferrite with spinel ferrite, to select kinds and amounts of elements to be contained. W-type hexagonal ferrite can also be used. Further, when magnetic powders are dispersed, particle surfaces of magnetic powders may be treated with substances compatible with the dispersion media and the polymers. Inorganic or organic compounds are used as a surface treating agent. For example, oxide or hydroxide of Si, Al, P, etc., various kinds of silane coupling agents, and various kinds of titanium coupling agents are representative examples. The amount of these surface treating agents is from 0.1 to 10% by weight based on the amount of the magnetic powder. The pH of magnetic powders is also important for dispersion, and is in general from 4 to 12. The optimal value is dependent upon the dispersion medium and the polymer. Taking chemical stability and storage stability of magnetic media into consideration, pH of from 6 to 11 or so is selected. The water content in the magnetic powder also affects dispersion. The optimal value is dependent upon the dispersion medium and the polymer, and the water content of from 0.01 to 2.0% by weight is selected in general. Producing methods of hexagonal ferrite powders include the following and any of these methods can be used in the present invention: (1) a glass crystallization method in which metal oxides which substitute barium oxide, iron oxide and iron, and boron oxide, etc., as a glass forming material are mixed so as to make a desired ferrite composition, melted, and then quenched to obtain an amorphous product, the obtained product is reheat-treated, washed and then pulverized to obtain a barium ferrite crystal powder, (2) a hydrothermal reaction method in which a solution of barium ferrite composition metal salts is neutralized with an alkali, byproducts are removed followed by liquid phase heating at 100° C. or more, washed, dried and then pulverized to obtain a barium ferrite crystal powder, and (3) a coprecipitation method in which a solution of barium ferrite composition metal salts is neutralized with an alkali, byproducts are removed followed by drying, treated at 1,100° C. or less, and then pulverized to obtain a barium ferrite crystal powder.

The coercive force (Hc) of the magnetic layer according to the present invention is preferably from 1,800 to 3,500 Oe, preferably from 1,900 to 3,000 Oe, and still more preferably from 2,200 to 3,000 Oe, and the maximum magnetic flux density (Bm) of the magnetic layer is preferably from 3,500 to 7,000 G, preferably from 3,900 to 7,000 G. If Hc and Bm are less than the lower limit, sufficient short wavelength output cannot be obtained, and if they are higher than the upper limit, output cannot be ensured because a head for use in recording becomes saturated.

Conventionally well-known thermoplastic resins, thermosetting resins, reactive resins and mixtures of these resins are used as a binder resin in the magnetic layer or the nonmagnetic layer of the magnetic recording medium in the present invention.

Thermoplastic resins having a glass transition temperature of from −100 to 150° C., a number average molecular weight of from 1,000 to 200,000, preferably from 10,000 to 100,000, and a polymerization degree of from about 50 to 1,000 can be used in the present invention.

Examples thereof include polymers or copolymers containing as a constituting unit the following compounds, such as vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal and vinyl ether; polyurethane resins and various rubber resins.

Examples of thermosetting resins and reactive resins usable in the present invention include phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyesterpolyol and polyisocyanate, and mixtures of polyurethane and polyisocyanate.

Preferably, at least one polar group selected from the following groups is introduced into the above binder resins by copolymerization or addition reaction for the purpose of further improving the dispersibility and the durability of ferromagnetic powders, e.g., —COOM, —SO$_3$M, —OSO$_3$M, —P=O(OM)$_2$, —O—P=O(OM)$_2$ (wherein M represents a hydrogen atom, or an alkali metal salt group), —OH, —NR$_2$, —N$^+$R$_3$ (R represents a hydrocarbon group), an epoxy group, —SH, or —CN. The content of the polar group is from $10^{-1}$ to $10^{-8}$ mol/g, preferably from $10^{-2}$ to $10^{-6}$ mol/g.

The amount of the binder resin for use in the magnetic recording medium according to the present invention is generally from 5 to 50% by weight, preferably from 10 to 30% by weight, based on the weight of the ferromagnetic powder. When vinyl chloride resins are used, the amount thereof is from 5 to 100% by weight, when polyurethane resins are used, the amount of the polyurethane resin is from 2 to 50% by weight, and it is preferred polyisocyanate is used in an amount of from 2 to 100% by weight in combination with these resins.

The packing density of ferromagnetic powders in the magnetic layer is represented by Bm/4πσ$_S$, which can be calculated from the saturation magnetization (σ$_S$) of the ferromagnetic powders used and Bm. In the case of ferromagnetic metal powders, the value in the present invention is preferably 1.7 g/ml or more, more preferably 1.9 g/ml or more, and most preferably 2.1 g/ml or more.

When polyurethane is used in the present invention, the polyurethane has a glass transition temperature of from −50 to 100° C., breaking extension of from 100 to 200%, breaking stress of from 0.05 to 10 kg/cm$^2$, and a yielding point of from 0.05 to 10 kg/cm$^2$.

Examples of the polyisocyanates which can be used in the present invention include isocyanates, e.g., tolylenediisocyanate, 4,4'-diphenylmethanediisocyanate, hexamethylenediisocyanate, xylyienediisocyanate, naphthylene-1,5-diisocyanate, o-toluidinediisocyanate, isophoronediisocyanate, and triphenylmethanetriisocyanate; reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR and Miiifonate MTL, (manufactured by Nippon Polyurethane Co , Ltd.), Takenate D-102, Takenate D-110N, Takenate D-200 and Takenate D-202 (manufactured by Takeda Chemical industries, Ltd.), and Desmodur L, Desmodur IL, Desmodur N and Desmodur HL (manufactured by Sumitomo Bayer Co., Ltd.) . These polyisocyanates may be used alone or in combinations of two or more thereof, taking advantage of a difference in curing reactivity in each layer.

In general, materials having various functions, for example, a lubricant, an abrasive, a dispersant, an antistatic agent, a plasticizer, a solvent and an antibacterial agent are added to the magnetic layer and/or the nonmagnetic layer of the magnetic recording medium of the present invention according to purposes.

Examples of the lubricants which can be used in the present invention include silicone oils such as dialkylpolysiloxane (the alkyl has from 1 to 5 carbon atoms), dialkoxypolysiloxane (the alkoxy has from 1 to 4 carbon atoms), monoalkylmonoalkoxypolysiloxane (the alkyl has from 1 to 5 carbon atoms and the alkoxy has from 1 to 4 carbon atoms), phenylpolysiloxane, and fluoroalkylpolysiloxane (the alkyl has êom 1 to 5 carbon atoms); electrically conductive fine powders such as graphite; Inorganic powders such as molybdenum disulfide and tungsten disulfide; plastic fine powders such as polyethylene, polypropylene, polyethylene-vinyl chloride copolymers, and polytetrafluoroethylene; (α-olefin polymers; saturated fatty acids which are solid at normal temperature (having from 10 to 22 carbon atons); unsaturated aliphatic hydrocarbons which are liquid at normal temperature (compounds having n-olefinic double bonds bonded to the terminal carbons, having about 20 carbon atoms); fatty acid esters comprising a monobasic fatty acid having from 12 to 20 carbon atoms and a monovalent alcohol having from 3 to 12 carbon atoms, and fluorocarbons.

Among these, saturated fatty acids and fatty acid esters are preferably used, and a combination of both are more preferably used. Examples of alcohols as a raw material of fatty acid esters include monoalcohols such as ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether, and s-butyl alcohol, and polyhydric alcohols such as ethylene glycol, diethylene glycol, neopentyl glycol, glycerin, and sorbitan derivatives. Examples of fatty acids include aliphatic carboxylic acid such as acetic acid, propionic acid, octanoic acid, 2-ethylhexanoic acid, lauric acid, myristic acid, stearic acid, palmitic acid, behenic acid, arachic acid, oleic acid, linoleic acid, linolenic acid, elaidic acid, and palmitoleic acid, and mixture of these acids.

Specific examples of fatty acid esters include various ester compounds, e.g., butyl stearate, s-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, mixtures of butyl stearate and butyl palmitate, butoxyethyl stearate, 2-butoxy-1-propyl stearate, products obtained by esterifying dipropylene glycol monobutyl ether with stearic acid, diethyleneglycol dipalmitate, diesterified products obtained by esterifying hexamethylenediol with myristic acid, and glycerin oleate.

To decrease the hydrolysis of fatty acid esters which is often caused when a magnetic recording medium is used under high humidity, the selection is performed such as branch/straight chain, anisotropic structure such as cis/trans, and branching positions of fatty acids and alcohols as a raw material. These lubricants are added in an amount of from 0.2 to 20 weight parts per 100 weight parts of the binder.

The following compounds can also be used as a lubricant, e.g., silicon oil, graphite, molybdenumdisulfide, boron nitride, graphite fluoride, fluorinated alcohol, polyolefin, polyglycol, alkyl phosphate, and tungsten disulfide.

Abrasives other than diamond particles can be added to the magnetic layer in the present invention. As the abrasive, well-known materials essentially having a Mohs' hardness of 6 or more may be used alone or in combination. Examples of such abrasives include α-alumina having an alpha-conversion rate of 90% or more, α-alumina, silicon carbide, chromium oxide, cerium oxide, α-iron oxide, corundum, silicon nitride, silicon carbide, titanium carbide, titanium oxide, silicon dioxide, and boron nitride. Composites composed of these abrasives (abrasives obtained by surface-treating with other abrasives) may also he used. Compounds or elements other than the main component are often contained in abrasives, but the intended effect can be attained so far as the content of the main component is 90% or more.

Abrasives preferably have a particle size of from 0.01 to 0.3 μm, more preferably from 0.01 to 0.25 μm, and in particular, for improving electromagnetic characteristics, abrasives having narrow particle size distribution are preferred. For improving durability, a plurality of abrasives each having a different particle size may be combined according to necessity, or a single abrasive having a broad particle size distribution may be employed so as to attain the same effect as such a combination. Prefer□ably, abrasives for use in the present invention have a tap density of from 0 .3 to 2 g/ml, a water content of from 0.1 to 5% by weight, a pH value of from 2 to 11, and a specific surface area ($S_{BET}$) of from 1 to 80 m$^2$/g. The shape of the abrasives to be used in the present invention may be any of acicular, spherical and die-like shapes. Preferably, the abrasive has a shape partly with edges, because a high abrasive property is given. Specific examples of abrasives for use in the present invention include AKP-12, AKP-15, AKP-20, AKP-30, AKP-50, HIT-20, HIT-30, HIT-55, HIT-60, HIT-70, HIT-80, and HIT-100 (manufactured by Sumitomo Chemical Co., Ltd.), ERC-DBM, RP-DBM, and HPS-DBM (manufactured by Reynolds International Inc.), WA10000 (manufactured by Fujimi Kenma K.K.), UB20 (manufactured by Uemura Kogyo K.K.), G-5, Kromex U2, and Kromex U1 (manufactured by Nippon Chemical Industrial Co., Ltd.), TF100 and TF140 (manufactured by Toda Kogyo Co., Ltd.), β-Random Ultrafine (manufactured by Ibiden Co., Ltd.), and B-3 (manufactured by Showa Mining Co., Ltd.) . These abrasives may also be added to a nonmagnetic layer, if necessary. By incorporating abrasives into a nonmagnetic layer, it is possible to control the surface shape or controlling a protruding state of abrasives. Particle sizes and amounts of abrasives to be added to a magnetic layer and a nonmagnetic layer should be selected independently at optimal values.

The magnetic layer and/or the nonmagnetic layer of the magnetic recording medium according to the present invention can contain electrically conductive particles other than the above-described nonmagnetic powders as an antistatic agent. However, to increase the saturation magnetic flux density of the magnetic layer to the maximum limit, the layer constitution is preferably a multilayer constitution wherein a nonmagnetic layer is provided between a support and a magnetic layer as far as possible, and the addition amount of an antistatic agent to the magnetic layer is reduced and the antistatic agent is added to the nonmagnetic layer.

The addition of carbon black as an antistatic agent is particularly preferred in view of reducing the surface electric resistance of the entire medium. Examples of carbon blacks for use in the present Invent on include furnace blacks for rubbers, thermal blacks for rubbers, carbon blacks for coloring, electrically conductive carbon blacks, acetylene blacks, etc. Carbon blacks for use in the present invention preferably have a specific surface area ($S_{BET}$) of from 5 to 500 m$^2$/g, a DBP oil absorption amount of from 10 to 1,500 ml/100 g, an average particle size of from 5 to 300 nm, pH of from 2 to 10, a water content of from 0.1 to 10% by weight, and a tap density of from 0.1 to 1 g/ml.

Specific examples of carbon blacks for use in the present invention include BLACKPEARLS 2000, 1300, 1000, 900, 800, and 700, and VULCAN XC-72 (manufactured by Cabot Co., Ltd.), #80, #60, #55, #50, and #35 (manufactured by Asahi Carbon Co., Ltd.), #3950B, #2700, #2650, #2600, #2400B, #2300, #900, #1000, #95, #30, #40, and #10B, MA230, MA220 and MA77 (manufactured by Mitsubishi Chemical Corp.), COTIDUCTEX SC, RAVEN 150, 50, 40, and 15 (manufactured by Columbia Carbon Co., Ltd.), and Ketjen Black SC, Ketjen Black ECDJ-500, and Ketjen Black ECDJ-600, (manufactured by Lion-Akzo Co., Ltd.). Carbon blacks for use in the present invention may previously be surface-treated with a dispersant, may be subjected to oxidation treatment, may be grafted with a resin, or a part of the surface thereof may be graphitized before use. Carbon blacks may be previously dispersed in a binder before addition to the magnetic coating solution. When carbon blacks are used in a magnetic layer, they are preferably used in an amount of from 0.1 to 30% by weight based on the amount of the magnetic powder. When a nonmagnetic layer is provided, carbon blacks are preferably used in an amount of from 3 to 20% by weight based on the amount of the inorganic nonmagnetic powder.

In general, carbon blacks can serve not only as an antistatic agent but also various functions such as reducing a friction coefficient, imparting a light-shielding property and improving a film strength. Such functions vary depending upon the kind of carbon blacks to be used. Accordingly, it is of course possible in the present invention to select and determine the kinds, the amounts and the combinations of the carbon blacks to be added according to purposes on the basis of the above mentioned various properties such as the particle size, the oil absorption amount, the electroconductivity and the pH value. Regarding carbon blacks for use in the present invention, for example, the disclosure in *Handbook of Carbon Blacks* (edited by Carbon Black Association of Japan) can be referred to.

The nonmagnetic layer provided between the magnetic layer and the support (hereinafter sometimes referred to as "a lower layer") of the magnetic recording medium according to the present invention will be described below. The constitution of the lower layer is not particularly limited so long as it is substantially nonmagnetic. The nonmagnetic layer generally comprises at least a resin, preferably a nonmagnetic powder, e.g., an inorganic nonmagnetic powder or an organic nonmagnetic powder dispersed in a binder resin can be exemplified.

Various compounds can be used as nonmagnetic powders, or example, α-alumina having an alpha-conversion rate of 90% or more, β-alumina, γ-alumina, silicon carbide, chromium oxide, cerium oxide, α-iron oxide, corundum, silicon nitride, titanium carbide, titanium oxide, silicon dioxide, boron nitride, zinc oxide, calcium carbonate, calcium sulfate, and barium sulfate can be used alone or in combination. These inorganic nonmagnetic powders preferably have a particle size of from 0.01 to 2 $\mu$m. If desired, a plurality of inorganic nonmagnetic powders each having a different particle size may be combined, or a single inorganic nonmagnetic powder having a broad particle size distribution may be employed so as to attain the same effect as such a combination. For improving dispersibility by increasing the interaction with the binder resin to be used, the inorganic nonmagnetic powder to be used may be surface-treated with inorganic substance such as silica, alumina, or silica-alumina, or may be treated with a coupling agent. Inorganic nonmagnetic powders for use in the present invention have a tap density of from 0.3 to 2 g/ml; a watercontent of from 0.1 to 5% by weight; a pH value of from 2 to 11; and a specific surface area ($S_{BET}$) of from 5 to 100 m$^2$/g. The shape of the above inorganic nonmagnetic powders may be any of an acicular shape, a spherical shape, a die-like shape, and a tabular shape. Specific examples of inorganic nonmagnetic powders include AKP-20, AKP-30, AKP-50, and HIT-50 (manufactured by Sumitomo Chemical Co., Ltd.), G5, G7, and S-1 (manufactured by Nippon Chemical Industrial Co., Ltd.), TF-100, TF-120 and TF-140 (manufactured by Toda Kogyo Co., Ltd.), TTO55 series and ET300W (manufactured by Ishihara Sangyo Kaisha Ltd.), STT-30 (manufactured by Titan Kogyo Co., Ltd.), and acicular hematite particles and acicular goethite particles which are intermediates of a ferromagnetic metal powder produced by magnetic iron oxide and iron oxide reducing method.

The layer constitution of the magnetic recording medium according to the present invention is not particularly restricted so long as the constitution substantially comprises at least a support having provided thereon the above magnetic layer or the above magnetic layer and the above nonmagnetic layer. And also a magnetic layer or a nonmagnetic layer of other constitutions may be provided. For example, in the case where a magnetic layer of the constitution different from the already formed magnetic layer is provided in place of the above nonmagnetic layer, various ferromagnetic powders can be used, e.g., an iron oxide ferromagnetic powder, a cobalt-modified iron oxide ferromagnetic powder, $CrO_2$, a hexagonal ferrite powder, and various ferromagnetic metal powders dispersed in a binder. These magnetic layers are referred to as lower layers and a magnetic layer provided on lower layers is called an upper layer.

The provision of two or more layers on a support is also effective to produce a magnetic recording medium of high recording density, and a wet-on-wet coating method is a particularly excellent simultaneous coating method capable of forming an extremely thin magnetic layer. Specific methods of wet-on-wet coating are described below.

(1) A method of coating a lower layer by any of gravure coating, roll coating, blade coating, and extrusion coating apparatuses, which are ordinarily used in the coating of a magnetic coating solution, and then coating an upper layer while the lower layer is still wet by means of the support pressing type extrusion coating apparatus disclosed, e.g., in JP-B-1-46186, JP-A-60-238179 and JP-A-2-265672.

(2) A method of coating an upper layer and a lower layer almost simultaneously using the coating head equipped with two slits for feeding coating solution as disclosed in JP-A-63-88080, JP-A-2-17971 and JP-A-2-265672.

(3) A method of coating an upper layer and a lower layer almost simultaneously using the extrusion coating apparatus equipped with a backup roll as disclosed in JP-A-2-174965.

When coating is performed by a wet-on-wet method, flowing characteristics of a lower layer coating solution are preferably closely akin to those or an upper layer coating solution as far as possible, because the turbulence does not occur at the interface between an upper layer and a lower layer coated and a uniform upper layer showing less thickness variation can be obtained. The flowing characteristics of a coating solution largely depend upon the combination of the powder particles and the binder resin in a coating solution, therefore, when the lower layer is a nonmagnetic layer, a nonmagnetic powder for use in the nonmagnetic layer should be selected carefully.

The thickness of the support of a magnetic recording medium according to the present invention is generally from 1 to 100 $\mu$m, and when the support is used as a tape-like medium, the thickness is preferably from 3 to 20 $\mu$m, and when used as a flexible disc, the thickness is preferably from 40 to 80 $\mu$m. The thickness of the nonmagnetic layer provided on a support is generally from 0.5 to 10 $\mu$m, preferably from 0.5 to 3 $\mu$m. When a magnetic layer is provided on a nonmagnetic layer, the dry thickness of the magnetic layer is preferably from 0.01 to 0.5 μm, more preferability from 0.05 to 0.4 μm.

The above-described nonmagnetic layer of the recording medium of the present invention exhibits the effect of the present invention so long as it is substantially a nonmagnetic layer even if, or intendedly, it contains a small amount of a magnetic powder as an impurity, which is as a matter of course regarded as essentially the same construction as in the present invention. The term "substantially a nonmagnetic layer" means that the residual magnetic flux density of the lower layer is 500 G or less and the coercive force of the lower layer is about 40% or less of that of the magnetic layer, preferably the residual magnetic flux density and the coercive force are zero.

A layer other than the above-described magnetic layer and nonmagnetic layer may be provided according to the purpose. For example, an undercoating layer may be provided between the support and the lower layer for adhesion improvement. The thickness of this undercoating layer is generally from 0.01 to 2 μm, preferably from 0.05 to 0.5 μm. A back coating layer may be provided on the surface side of the support opposite to the side having the magnetic layer. The thickness of this back coating layer is generally from 0.1 to 2 μm, preferably from 0.3 to 1.0 μm. Well-known undercoating layers and back coating layers can be used for this purpose. In the case of a disc-like magnetic recording medium, the foregoing layer constitution can be provided on both surface sides of the support or may be provided on either one surface side.

A support for use in the present invention is not particularly limited and ordinarily used support can be used. Examples of materials for forming a support include a film of various synthetic resin such as polyethylene terephthalate, polyethylene, polypropylene, polycarbonate, polyethylene naphthalate, polyamide, polyamideimide, polyimide, polysulfone, and polyether sulfone, and a metal foil such as aluminum foil, and stainless steel foil.

For effectively attaining the object of the present invention, it is preferred to use the support having a central line average surface roughness (Ra) (cut-off value: 0.25 mm) of 0.03 μm or less, preferably 0.02 μm or less, and more preferably 0.01 μm or less. It is preferred that the support not only has a small central line average surface roughness but also is free from coarse protrusions having a height of 1 μm or more. Surface roughness configuration is freely controlled by the size and the amount of fillers added to the support. Examples of such the fillers include acryl-based organic resin fine powders, as well as oxides or carbonates of Ca, Si and Ti. The support for use in the present invention preferably has an F-5 value of from 5 to 50 kg/mm² in the web-running direction and an F-5 value of from 3to 30 kg/mm² in the transverse direction or the web. In general, the F-5 value in the machine direction of the web is higher than that in the transverse direction thereof. However, this arrangement does not apply to the case where the transverse strength of the web is intended to be especially elevated.

The thermal shrinkage at 100° C. for 30 minutes of the support for use in the present invention is preferably 3% or less and more preferably 1.5% or less, in both the web-running direction and the transverse direction and further the thermal shrinkage at 80° C. for 30 minutes is preferably 1% or less, more preferably 0.5% or less in both the directions. The breaking strength of the support is preferably from 5 to 100 kg/mm² in both the directions, and the modulus of elasticity thereof is preferably from 100 to 2,000 kg/mm² in both the directions.

Organic solvents for use in the present invention may be used in an optional proportion. Examples of suitable organic solvents include ketones such as acetone, methyl ethyl ketone, methyl isobutyl ketone, diisobutyl ketone, cyclohexanone, isophorone, tetrahydrofuran; alcohols such as methanol, ethanol, propanol, butanol, isobutyl alcohol, isopropyl alcohol and methylcyclohexanol; esters such as methyl acetate, butyl acetate, isobutyl acetate, isopropyl acetate, ethyl lactate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylenechlorohydrin and dichlorobenzene; N,N-dimethylformamide, and hexane. The organic solvents for use in the present invention may not necessarily be 100% pure and may contain impurities such as isomers, non-reactedmaterials, byproducts, decomposed products, oxides and water, in addition to the main component. However, the content of such impurities is preferably 30% or less, more preferably 10% or less. The kinds and amounts of the organic solvents to be used in the magnetic layer and the nonmagnetic layer of the present invention may be varied, if necessary. For instance, a highly volatile solvent is used in the nonmagnetic layer to improve the surface property, a solvent having a high surface tension (for example, cyclohexanone or dioxane) is used in the nonmagnetic layer so as to improve the coating stability, and a solvent having a high solubility parameter of the magnetic layer is used so as to increase the packing density, but examples are not limited thereto.

The magnetic recording medium according to the present invention is produced by kneading and dispersing the above ferromagnetic powder, binder resin and, if necessary, other additives, with an organic solvent. The thus-obtained magnetic coating solution is coated on a support, oriented according to necessity, and dried.

Processes of preparing the magnetic coating solution for use in the magnetic recording medium of the present invention comprise at least a kneading step, a dispersing step and, optionally, blending steps to be carried out before and/or after the kneading and dispersing steps. Any of these respective steps may be composed of two or more separate stages. Materials such as a ferromagnetic powder, a binder, a carbon black, an abrasive, an antistatic agent, a lubricant, a solvent, and the like for use in the present invention may be added at any step at any time. Each material may be added at two or more steps dividedly. For example, polyurethane can be added dividedly at a kneading step, a dispersing step, or a blending step for adjusting viscosity after dispersion.

Various kneaders are used for kneading and dispersing a magnetic coating solution, for example, a two-roll mill, a three-roll mill, a ball mill, a pebble mill, a trommel, a sand grinder, a Szegvari, an attriter, a high speed impeller, a high speed stone mill, a high speed impact mill, a disper, a kneader, a high speed mixer, a homogenizer, and an ultrasonic disperser can be used.

For achieving the object of the present invention, the above steps can be performed partly with conventionally well-known techniques. However, powerful kneading machines such as a continuous kneader or a pressure kneader are preferably used. When a continuous kneader or a pressure kneader is used, all or a part of the binder (preferably 30% by weight or more of the total binders) is kneading-treated in the range of from 15 parts to 500 weight parts per 100 weight parts of the ferromagnetic powder together with the ferromagnetic powder. Details of these kneading treatments are disclosed in JP-A-1-106338 and JP-A-64-79274. In the present invention, by using a simultaneous multilayer coating method as disclosed in JP-A-62-212933, the production can be performed effectively.

The residual amount of the solvent in the magnetic layer of the magnetic recording medium according to the present invention is preferably 100 mg/m$^2$ or less, more preferably 10 mg/m$^2$ or less, and the residual amount of the solvent in the magnetic layer is preferably smaller than that in the nonmagnetic layer.

The void ratio is preferably not more than 30% by volume, more preferably not more than 10% by volume, with any of the nonmagnetic layer and the magnetic layer. The void ratio in the nonmagnetic layer is preferably larger than that in the magnetic layer, but if the void ratio in the nonmagnetic layer is 5% by capacity or more, it may be smaller than that in the magnetic layer.

The magnetic recording medium according to the present invention can comprise an upper layer and a lower layer. It can be easily presumed that these physical properties can be varied according to purposes in the lower layer and the upper layer. For example, the modulus of elasticity of the upper layer is made higher to improve running durability and at the same time the modulus of elasticity of the lower layer is made lower than that of the magnetic layer to improve the head touching of the magnetic recording medium.

The ferromagnetic powder in the magnetic layer thuscoated on the support is subjected to orientation according to necessity, and the magnetic layer formed is dried. If necessary, the surface smoothing treatment is performed, cut to a desired shape, thereby the magnetic recording medium according to the present invention is obtained.

The modulus of elasticity at 0.5% elongation of the magnetic layer is preferably from 100 to 2,000 kg/mm$^2$ in the web-coating direction and the width direction, the breaking strength is preferably from 1 to 30 kg/cm$^2$, the modulus of elasticity of the magnetic recording medium is preferably from 100 to 1,500 kg/mm$^2$ in the web-coating direction and the width direction, the residual elongation is preferably 0.5% or less, and the thermal shrinkage factor at every temperature of 100° C. or less is preferably 1% or less, more preferably 0.5% or less, and most preferably 0.1% or less.

The magnetic recording medium according to the present invention may be used as tapes for video use and audio use, as a floppy disc and a magnetic disc for data recording use, but is especially effectively used as a medium for digital recording use where the dropout of a signal is fatal. Further, by providing a lower nonmagnetic layer and making the thickness of a magnetic layer 0.5 µm or less (preferably from 0.01 to 0.5 µm, and more preferably from 0.05 to 0.5 µm), a high density and high capacity magnetic recording medium excellent in electromagnetic characteristics and overwriting characteristics can be obtained.

EXAMPLE

The novel characteristics of the present invention will be described in detail below with reference to specific examples, but it should not be construed as being limited thereto. In the examples, "part" means "weight part" unless otherwise indicated.

Magnetic Tape

Magnetic tape was prepared using the magnetic powder shown in Table 1 below.

TABLE 1

Ferromagnetic Metal Powder

| | Average Long Axis Length (nm) | Average Acicular Ratio | Hc | $\sigma_s$ (emu/g) | Element Contained (atomic % based on Fe) | Variation Coefficient of Acicular Ratio (%) |
|---|---|---|---|---|---|---|
| MP (1) | 103 | 6.1 | 2,420 | 154 | Co: 30 Al: 7 Y: 6 | 28 |

Example 1

The following compositions of a magnetic layer and a nonmagnetic layer were prepared for producing a magnetic tape having a multilayer constitution in which a diamond particle having an average particle diameter of 200 nm, a variation coefficient of a particle diameter of 58%, and characteristics shown in Example 1 in the following Table 2 was used.

| Composition of Magnetic Layer | |
|---|---|
| Ferromagnetic metal powder | 100 parts |
| average long axis length: 103 nm, | |
| acicular ratio: 6.1, variation | |
| coefficient of acicular ratio: 28%, | |
| Hc: 2,420 Oe, 154 emu/g | |
| Binder resin | |
| Vinyl chloride polymer | 13 parts |
| an -SO$_3$Na group content: 1 × 10$^{-4}$ eq/g, | |
| polymerization degree: 300 | |
| Polyester polyurethane resin | 5 parts |
| (neopentyl glycol/caprolactone polyol/ | |
| NDI = 0.9/2.6/1 | (molar ratio), |
| an -SO$_3$Na group content: 1 × 10$^{-4}$ eq/g | |
| Artificial diamond | 0.2 part |
| average particle diameter: | 200 m, |
| Carbon black | 1.0 part |
| average particle diameter: | 40 nm |
| Butyl stearate | 1 part |
| Stearic acid | 2 parts |
| Mixed solvent of methyl ethyl ketone and cyclohexanone (1/1) | 200 parts |
| Composition of Nonmagnetic Layer | |
| Acicular hematite | 80 parts |
| S$_{BET}$: 55 m$^2$/g, | |
| average long axis length: 0.12 m, | |
| acicular ratio: 8, pH: 8.8, | |
| Al/Fe: 6.5 atomic % | |
| Carbon black | 20 parts |
| average particle diameter: 17 nm, | |
| DBP oil absorption: 80 ml/100 g, | |
| S$_{BET}$: 240 m$^2$/g, pH: 7.5 | |
| Binder resin | |
| Vinyl chloride polymer | 12 parts |
| an -SO$_3$Na group content: 1 × 10$^{-4}$ eq/g, | |
| polymerization degree: 300 | |
| Polyester polyurethane resin | 5 parts |
| (neopentyl glycol/caprolactone polyol/ | |
| NDI = 0.9/2.6/1 (molar ratio), | |
| an -SO$_3$Na group content: 1 × 10$^{-4}$ eq/g, | |
| Butyl stearate | 1 part |
| Stearic acid | 2.5 parts |
| Mixed solvent of methyl ethyl ketone and cyclohexanone (1/1) | 200 parts |

Each of the above compositions of the magnetic layer and the nonmagnetic layer was kneaded in a kneader, then dispersed with a sand grinder. Polyisocyanate was added to the obtained dispersion solution in an amount of 5 parts to the nonmagnetic layer coating solution and 6 parts to each magnetic layer coating solution, further 20 parts of a 1/1 mixed solvent of methyl ethyl ketone and cyclohexanone was added thereto, and each solution was filtered through a filter having an average pore diameter of 1 μm, thereby coating solutions for the magnetic layer and the nonmagnetic layer were obtained.

These coating solutions were simultaneously multilayer-coated on a polyethylene terephthalate support having a thickness of 7 μm. The nonmagnetic layer coating solution was coated in a dry thickness of 1.5 μm, immediately after the magnetic layer coating solution was coated on the nonmagnetic layer so as to give the magnetic layer having the thickness of 0.15 μm. The coated layers were subjected to orientation in the machine direction while both layers were still wet by passing through an orientation apparatus. The layers were passed through a rare earth magnet (magnetic flux of the surface: 5,000 G), and then a solenoid magnet (magnetic flux density: 5,000 G), dried in the solenoid in such a degree as the orientation did not go back, and then the magnetic layer was further dried, and wound up. After drying, the coated layer was subjected to calendering treatment with calendars of 7 stages at 90° C. The obtained web was slit to an 8 mm wide to obtain a sample of an 8 mm video tape. With respect to each sample obtained, magnetic characteristics using a vibrating sample magnetometer, surface roughness, and output at ½ Tb and C/N using a drum tester were measured. The results obtained are shown in Table 2. Super DC tape (manufactured by Fuji Photo Film Co., Ltd.) was used as a standard of electromagnetic characteristics.

Still characteristics were reproduced by still mode using an 8 mm video cassette FUJIX 8 (manufactured by Fuji Photo Film Co., Ltd.). The measurement was conducted under three environments of 23° C., 50% RH, 5° C. 20% RH, and 40° C. 80% RH, and evaluated by the following criteria.

○: Well reproduced under all of three environments for 30 minutes or more.

Δ: Well reproduced at least under one environment for 15 to 30 minutes.

x: Well reproduced at least under one environment for only less than 15 minutes.

Magnetic characteristics were measured using a vibrating sample magnetometer (a product of Toei Kogyo Co., Ltd.) by an external magnetic field at 5 KOe in parallel to the orientation direction. SQ means a squareness ratio.

Surface roughness of the area of 250 μm×250 μm was measured using a light interference type three dimensional roughness meter "TOPO-3D" (a product of WYKO, Arizona, U.S.A.). Inclination compensation, spherical compensation and cylindrical compensation were applied according to JIS-B601 in time of calculation of a measured value. Central plane average surface roughness (Ra) was taken as a surface roughness value.

Examples 2 to 11

Multilayer tapes were produced in the same manner as in Example 1 except that diamond particles having the characteristics shown in Examples 2 to 11 in the following Table 2 were used in amounts (weight parts) shown in Table 2.

Examples 12 to 14

Multllayer tapes were produced in the same manner as in Example 1 except that diamond particles having the characteristics shown in Examples 12 to 14 in the following Table 2 and α-alumina powder (average particle diameter: 180 nm) were used in amounts (weight parts) shown in Table 2.

Comparative Examples 1 and 2

Multilayer tapes were produced in the same manner as in Example 1 except that inorganic powders having the characteristics shown in Comparative Examples 1 and 2 in the following Table 2 were used as abrasives in amounts (weight parts) shown in Table 2.

Comparative Examples 3 and 4

Multilayer tapes were produced in the same manner as in Example 1 except that diamond particles having the characteristics shown in Comparative Examples 3 and 4 in the following Table 2 were used in amounts (weight parts) shown in Table 2.

Example 15

A sample was produced in the same manner as in Example 1 except that the diamond particle having the characteristics shown in Example 15 in the following Table 2 was used in the amount (weight parts) shown in Table 2. The magnetic layer coating solution was coated on a polyethylene terephthalate support having a thickness of 7 μm. The coated layer was subjected to orientation in the machine direction while the coated layer was still wet by passing through an orientation apparatus. The layer was passed through a rare earth magnet (magnetic flux of the surface: 5,000 G) and then a solenoid magnet (magnetic flux density: 5,000 G), dried in the solenoid in such a degree as the orientation did not go back, and then the magnetic layer was further dried, and wound up. After drying, the coated layer was subjected to calendering treatment with calenders of 7 stages at 90° C. The obtained web was slit to an 8 mm wide to obtain a sample of an 8 mm video tape of monolayer coating. With respect to the sample obtained, magnetic characteristics using a vibrating sample magnetometer, surface roughness, and output at ½ Tb and C/N using a drum tester were measured. The results obtained are shown in Table 2. Super DC tape (manufactured by Fuji Photo Film Co., Ltd.) was used as a standard of electromagnetic characteristics.

Comparative Example 5

A monolayer magnetic tape was produced in the same manner as in Example 15 except that the inorganic powder having the characteristics shown in Comparative Example 5 in the following Table 2 was used as an abrasive in an amount (weight parts) shown in Table 2.

TABLE 2

Magnetic Tape

| | Particle Diameter and Variation Coefficient of Diamond Particle | | | | Abrasives Other than Diamond | | |
|---|---|---|---|---|---|---|---|
| | Average Particle Diameter (nm) | Standard Deviation of Particle Diameter | Variation Coefficient of Particle Diameter (%) | Amount (pts.) | Kind | Average Particle Diameter (nm) | Amount (pts.) |
| Ex. 1 | 200 | 116.0 | 58.0 | 0.2 | | | |
| Ex. 2 | 185 | 90.0 | 48.6 | 0.2 | | | |
| Ex. 3 | 148 | 66.0 | 44.6 | 0.2 | | | |
| Ex. 4 | 134 | 55.0 | 41.0 | 0.2 | | | |
| Ex. 5 | 123 | 53.0 | 43.1 | 0.2 | | | |
| Ex. 6 | 101 | 39.0 | 38.6 | 0.2 | | | |
| Ex. 7 | 101 | 39.0 | 38.6 | 0.4 | | | |
| Ex. 8 | 78 | 33.0 | 42.3 | 0.2 | | | |
| Ex. 9 | 45 | 16.0 | 35.6 | 0.2 | | | |
| Ex. 10 | 22 | 10.0 | 45.5 | 0.2 | | | |
| Ex. 11 | 5 | 1.6 | 32.0 | 0.2 | | | |
| Ex. 12 | 200 | 116.0 | 58.0 | 0.1 | alumina | 180 | 0.2 |
| Ex. 13 | 101 | 38.0 | 38.6 | 0.1 | alumina | 180 | 0.2 |
| Ex. 14 | 5 | 1.0 | 32.0 | 0.1 | alumina | 180 | 0.2 |
| Ex. 15 | 101 | 38.6 | 38.6 | 0.2 | | | |
| Comp. Ex. 1 | | | | | alumina | 180 | 2.0 |
| Comp. Ex. 2 | | | | | alumina | 180 | 0.2 |
| Comp. Ex. 3 | 227 | 199.7 | 88.0 | 0.2 | | | |
| Comp. Ex. 4 | 126 | 102.0 | 81.0 | 0.4 | | | |
| Comp. Ex. 5 | | | | | alumina | 180 | 2.0 |

| | Magnetic Characteristics | | Bm (G) | Ra (nm) | Output (dB) | C/N (dB) | Still Durability |
|---|---|---|---|---|---|---|---|
| | Hc (Oe) | SQ | | | | | |
| Ex. 1 | 2,382 | 0.85 | 4,610 | 2.5 | 2.9 | 2.2 | ○ |
| Ex. 2 | 2,379 | 0.85 | 4,650 | 2.4 | 3.0 | 2.2 | ○ |
| Ex. 3 | 2,377 | 0.85 | 4.670 | 2.4 | 3.2 | 2.4 | ○ |
| Ex. 4 | 2,376 | 0.85 | 4,650 | 2.3 | 3.3 | 2.4 | ○ |
| Ex. 5 | 2,378 | 0.86 | 4,658 | 2.2 | 3.2 | 2.4 | ○ |
| Ex. 6 | 2,372 | 0.86 | 4,700 | 2.2 | 3.4 | 2.5 | ○ |
| Ex. 7 | 2,368 | 0.86 | 4,730 | 2.2 | 3.4 | 2.4 | ○ |
| Ex. 8 | 2,388 | 0.86 | 4,520 | 2.4 | 3.2 | 2.1 | ○ |
| Ex. 9 | 2,374 | 0.85 | 4,745 | 2.2 | 3.4 | 2.6 | ○ |
| Ex. 10 | 2,369 | 0.86 | 4,790 | 2.2 | 3.5 | 2.6 | ○ |
| Ex. 11 | 2,368 | 0.87 | 4,830 | 2.1 | 3.7 | 2.8 | ○ |
| Ex. 12 | 2,383 | 0.85 | 4,650 | 2.6 | 2.8 | 2.1 | ○ |
| Ex. 13 | 2,381 | 0.85 | 4,670 | 2.5 | 2.9 | 2.2 | ○ |
| Ex. 14 | 2,377 | 0.85 | 4,680 | 2.4 | 2.9 | 2.2 | ○ |
| Ex. 15 | 2,371 | 0.86 | 4,710 | 4.7 | 0.9 | −1.4 | ○ |
| Comp. Ex. 1 | 2,364 | 0.82 | 4,060 | 3.1 | 1.5 | 0.8 | ○ |
| Comp. Ex. 2 | 2,360 | 0.84 | 4,560 | 2.7 | 2.3 | 1.6 | × |
| Comp. Ex. 3 | 2,370 | 0.85 | 4,590 | 2.8 | 2.1 | 1.2 | ○ |
| Comp. Ex. 4 | 2,373 | 0.85 | 4,510 | 2.9 | 2.2 | 1.5 | ○ |
| Comp. Ex. 5 | 2,364 | 0.82 | 4,060 | 5.2 | −0.6 | −3.5 | ○ |

It is apparent from the results in Table 2 that the samples of Examples 1 to 14 according to the present invention show that the surface roughness is small, and output, C/N and still durability are excellent. The samples of the present invention in which diamond particles having an average particle diameter of from 3 to 200 nm and variation coefficients of particle diameters of from 3 to 60% are used, do not show so large characteristic variation. However, the sample of Example 15, a monolayer tape, is inferior in electromagnetic characteristics but still durability is the same as those of multilayer tapes. The samples of comparative examples in which diamond particles having large variation coefficients of particle diameters are used, show high noise and inferior C/N. The comparative samples in which alumina are used in place of diamond particle show high noise, and are inferior in C/N and still durability. It is considered that surface roughness can be made small and magnetization turbulence can be decreased by using diamond fine particle and making the variation coefficient of particle diameter smaller. Magnetic recording media in which such a diamond particle is used can reduce noise, increase C/N and is excellent in still durability.

Magnetic Disc

Examples 16 to 25, Comparative Examples 6 to 9

Magnetic discs were produced as follows using the magnetic powders shown in the above Table 1 and the following Table 3.

TABLE 3

Barium Ferrite Powder

| | Average Tabular Diameter (nm) | Average Tabular Ratio | Hc (Oe) | $\sigma_s$ (emu/g) | Element Contained (mol per mol of Ba) |
|---|---|---|---|---|---|
| BaF (1) | 25 | 3 | 2,380 | 56 | Zn: 0.8<br>Co: 0.2<br>Nb: 0.45<br>Al: 1.5 |

Preparation of Coating Solution

| Magnetic Coating Solution | |
|---|---|
| Barium ferrite powder BaF (1) | 100 parts |
| Vinyl chloride copolymer MR555 (manufactured by Nippon Zeon Co., Ltd.) | 5 parts |
| Polyurethane resin uR8200 (manufactured by Toyobo Co., Ltd.) | 3 parts |
| Carbon black 50 (manufactured by Asahi Carbon Co., Ltd.) | 1 part |
| Phenylphosphonic acid | 2 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |
| Magnetic Coating Solution | |
| Ferromagnetic metal powder MP (1) | 100 parts |
| vinyl chloride polymer | 12 parts |
| MR110 (manufactured by Nippon Zeon Co., Ltd.) | |
| Polyurethane resin UR8200 (manufactured by Toyobo Co., Ltd.) | 3 parts |
| Carbon black #50 (manufactured by Asahi Carbon Co., Ltd.) | 5 parts |
| Phenylphosphonic acid | 3 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 180 parts |
| Cyclohexanone | 180 parts |
| Nonmagnetic Coating Solution | |
| Nonmagnetic powder, TiO$_2$, crystal system rutile | 80 parts |
| Average particle size: 0.035 μm | |
| Specific surface area (S$_{BET}$): 40 m$^2$/g | |
| pH: 7 | |
| TiO$_2$ content: 90% or nore | |
| DBP oil absorption: 27 to 38 ml/100 g | |
| Surface-covering compound: Al$_2$O$_3$, present on the surfaces of particles in an amount of 8 wt % based on total particles | |
| Carbon black | 20 parts |
| CONDUCTEX SC-U (manufactured by Columbia Carbon Co., Ltd.) | |
| Vinyl chloride copolymer | 12 parts |
| MR110 (manufactured by Nippon Zeon Co., Ltd.) | |
| Polyurethane resin | 5 parts |
| UR 8200 (manufactured by Toyobo Co., Ltd.) | |
| Phenylphosphonic acid | 4 parts |
| Butyl stearate | 10 parts |
| Butoxyethyl stearate | 5 parts |
| Isohexadecyl stearate | 2 parts |
| Stearic acid | 3 parts |
| Nethyl ethyl ketone/cyclohexanone (8/2 mixed solvent) | 250 parts |

Preparation of Disc

Each of the above compositions of the coating solutions for the magnetic layer and the nonmagnetic layer were respectively blended in a kneader, the prescribed particles were added (or not added) to the prescribed magnetic layers as shown in Table 4 below, and then dispersed with a sand mill. α-Alumina (HIT55) paste (SLH55, manufactured by Sumitomo Chemical Co., Ltd.) was added (or not added) to the above-obtained dispersion solution in the prescribed amount shown in Table 4 (weight parts), further polyisocyanate was added in an amount of 10 parts to the nonmagnetic coating solution and 10 parts to the magnetic coating solution, and further 40 parts of cyclohexanone was added to each solution, and filtered through a filter having an average pore diameter of 1 μm, thereby coating solutions for the magnetic layer and the nonmagnetic layer were obtained.

These coating solutions were simultaneously multilayer-coated on a polyethylene terephthalate support having a thickness of 62 μm and a central plane average surface roughness of 3 nm of the surface side on which a magnetic layer was to be coated. The nonmagnetic layer coating solution was coated in a dry thickness of 1.5 μm, immediately after the magnetic layer coating solution was coated on the nonmagnetic layer in a dry thickness of 0.2 μm. The coated layers in which ferromagnetic metal powder was added were subjected to random orientation while both the layers were still wet by passing through an alternating current magnetic field generator having two magnetic field intensities of frequency of 50 Hz, magnetic field intensity of 250 Gauss and frequency of 50 Hz, magnetic field intensity of 120 Gauss. After drying, the coated layer was subjected to calendering treatment with calenders of 7 stages at 90° C. at line pressure of 300 kg/cm. The obtained web was punched to a disc of 3.7 inches, the disc was subjected to a surface treatment by abrasives, thereby a disc medium was obtained.

In the case where a barium ferrite was used, a disc medium was obtained by the same procedure as the above except that random orientation was omitted.

The characteristics of each of the above-prepared magnetic materials and magnetic discs were evaluated as follows.

(1) Magnetic characteristics (Hc):

Magnetic characteristics were measured using a vibrating sample magnetometer (a product of Toei Kogyo Co., Ltd.) by Hm 10 KOe.

(2) Central plane average surface roughness (Ra):

Surface roughness (Ra) of the area of about 250 μm×250 μm was measured using "TOPO3D" (a product of WYKO, U.S.A.) by 3D-MIRAU method. The wavelength of measurement was 650 nm and spherical compensation and cylindrical compensation were applied. Measurement was performed using a light interference type non-contact surface roughness meter.

(3) Electromagnetic characteristics of a disc:

Output/reproduction was measured using a disc tester manufactured by Kokusai Denshi Kogyo Co., Ltd. (the late Tokyo Engineering Co., Ltd.) and an SK606B type disc evaluation apparatus by a metal-in-gap head having a gap length of 0.3 μm. Recording was conducted at the position of radius of 24.6 mm by a recording wavelength of 90 KFCI, then reproduction output of a head amplifier was determined by an oscilloscope 7633 type manufactured by Techtronlics Co., Ltd.

S/N ratio: After DC erasure of the disc used for determining reproduction output, reproduction output (noise level) was measured by a TR4171 type spectrum analyzer (manufactured by Advantes Co., Ltd.).

−20log (noise/reproduction output) was taken as S/N ratio and represented as a relative value taking the S/N value of samples in Comparative Example 6 and Comparative Example 8 as 0 dB.

(4) Durability:

A floppy disc drive ("ZIP100", a product of IOMEGA CORP., U.S.A., rotation number: 2,968 rpm) was used. The head was fixed at the position of radius of 38 mm. Recording was conducted at recording density of 34 kfci, and then the signals recorded was reproduced and this was taken as 100%. The disc was run under the following thermo-cycle condition, which being taken as one cycle. The point when a scratch was visually observed was taken as NG. The durability time of the medium in Comparative Example 6 was taken as 100%.

Thermo-Cycle Flow

25° C., 50% RH, 1 hr→(temperature rise, 2 hr)→60° C., 20% RH, 7 hr→(temperature down, 2 hr)→25° C., 50% RH, 1 hr→(temperature drop, 2 hr)→5° C., 10% RH, 7 hr→(temperature rise, 2 hr)→(this cycle was repeated).

The results of the evaluation of magnetic discs are shown in Table 4.

TABLE 4

| | | Magnetic Disc | | | |
|---|---|---|---|---|---|
| | | Particle Diameter and Variation Coefficient of Diamond Particle | | | |
| | Kind of Magnetic Coating Solution | Average Particle Diameter (nm) | Standard Deviation of Particle Diameter | Variation Coefficient of Particle Diameter (%) | Addition Amount (parts) |
| Ex. 16 | FaF (1) | 200 | 116.0 | 58.0 | 1.5 |
| Ex. 17 | FaF (1) | 101 | 39.0 | 38.6 | 1.5 |
| Ex. 18 | FaF (1) | 200 | 116.0 | 58.0 | 1.0 |
| Ex. 19 | FaF (1) | 101 | 39.0 | 38.6 | 0.5 |
| Ex. 20 | FaF (1) | 101 | 39.0 | 38.6 | 0.3 |
| Ex. 21 | MP (1) | 200 | 116.0 | 58.0 | 1.5 |
| Ex. 22 | MP (1) | 101 | 39.0 | 38.6 | 1.5 |
| Ex. 23 | MP (1) | 200 | 116.0 | 58.0 | 0.3 |
| Ex. 24 | MP (1) | 101 | 39.0 | 38.6 | 0.3 |
| Ex. 25 | MP (1) | 200 | 116.0 | 58.0 | 1.0 |
| Comp. Ex. 6 | FaF (1) | | | | |
| Comp. Ex. 7 | FaF (1) | | | | |
| Comp. Ex. 8 | MP (1) | | | | |
| Comp. Ex. 9 | MP (1) | | | | |

| | Abrasives Other than Diamond Particle | | Magnetic Characteristics Hc (Oe) | Ra (nm) | S/N (dB) | Durability (%) |
|---|---|---|---|---|---|---|
| | Kind | Average Particle Diameter (nm) | Addition Amount (parts) | | | |
| Ex. 16 | | | | 2,410 | 3.1 | 3.9 | 100 |
| Ex. 17 | | | | 2,400 | 2.7 | 4.4 | 100 |
| Ex. 18 | | | | 2,410 | 3.0 | 4.1 | 100 |
| Ex. 19 | alumina | 180 | 5.0 | 2,410 | 3.0 | 3.9 | 100 |
| Ex. 20 | alumina | 180 | 10.0 | 2,400 | 2.9 | 4.0 | 100 |
| Ex. 21 | | | | 2,374 | 3.1 | 3.5 | 100 |
| Ex. 22 | | | | 2,369 | 3.0 | 3.5 | 100 |
| Ex. 23 | alumina | 180 | 7.0 | 2,368 | 3.2 | 3.6 | 100 |
| Ex. 24 | alumina | 180 | 7.0 | 2,383 | 3.1 | 3.9 | 100 |
| Ex. 25 | | | | 2,381 | 2.5 | 4.0 | 100 |
| Comp. Ex. 6 | alumina | 180 | 20.0 | 2,400 | 4.1 | 0.0 | 100 |
| Comp. Ex. 7 | alumina | 180 | 10.0 | 2,410 | 3.9 | 2.5 | 30 |
| Comp. Ex. 8 | alumina | 180 | 20.0 | 2,380 | 4.1 | 0.0 | 0 |
| Comp. Ex. 9 | alumina | 180 | 10.0 | 2,360 | 3.5 | 2.1 | 2 |

As is apparent from the results of Table 4. samples in the examples according to the present invention are excellent in S/N ratio and durability, on the other hand, samples in comparative examples are inferior in at least either of S/N ratio or durability.

EFFECT OF THE INVENTION

A magnetic recording medium excellent in the surface roughness and abrasive property can be formed with a small amount of diamond particle by atomizing a diamond particle to an average particle diameter of from 3 to 200 nm and by making variation coefficients of particle diameters even such as 3 to 60%. Further, by the use of ferromagnetic metal powders as a magnetic powder, a magnetic recording medium excellent in output in short wavelength region, excellent in noise, C/N ratio, still and durability can be obtained. In particular, the noise in electromagnetic characteristics can be improved while maintaining the durability. Further, the magnetic recording medium according to the present invention shows less magnetization turbulence and is applicable to an MR head.

While the invention has been described in detail and with reference to specific examples thereof, it will be apparent to one skilled in the art that various changes and modifications can be made therein without departing from the spirit and scope thereof.

What is claimed is:

1. A magnetic recording medium which comprises a support having provided thereon a magnetic layer containing at least a ferromagnetic powder and diamond particles, wherein said diamond particles have an average particle diameter of from 3 to 200 nm and a variation coefficient of the particle diameter of from 3 to 60%.

2. The magnetic recording medium as claimed in claim 1, wherein a nonmagnetic layer comprising a nonmagnetic powder and a binder resin as main components is provided between said support and said magnetic layer, and said magnetic layer has a dry thickness of from 0.01 to 0.5 µm.

3. The magnetic recording medium as claimed in claim 1, wherein said ferromagnetic powder is a ferromagnetic metal powder having an average long axis length of from 30 to 120 nm, an average acicular ratio of from 3.0 to 10.0, and a variation coefficient of acicular ratio of from 5 to 30%.

4. The magnetic recording medium as claimed in claim 1, wherein said ferromagnetic powder is a hexagonal ferrite powder having an average tabular diameter of 50 nm or less.

5. The magnetic recording medium as claimed in claim 1, wherein said diamond particle is contained in an amount of from 0.001 to 5 weight parts per 100 weight parts of the ferromagnetic powder.

* * * * *